United States Patent Office 3,437,057
Patented Apr. 8, 1969

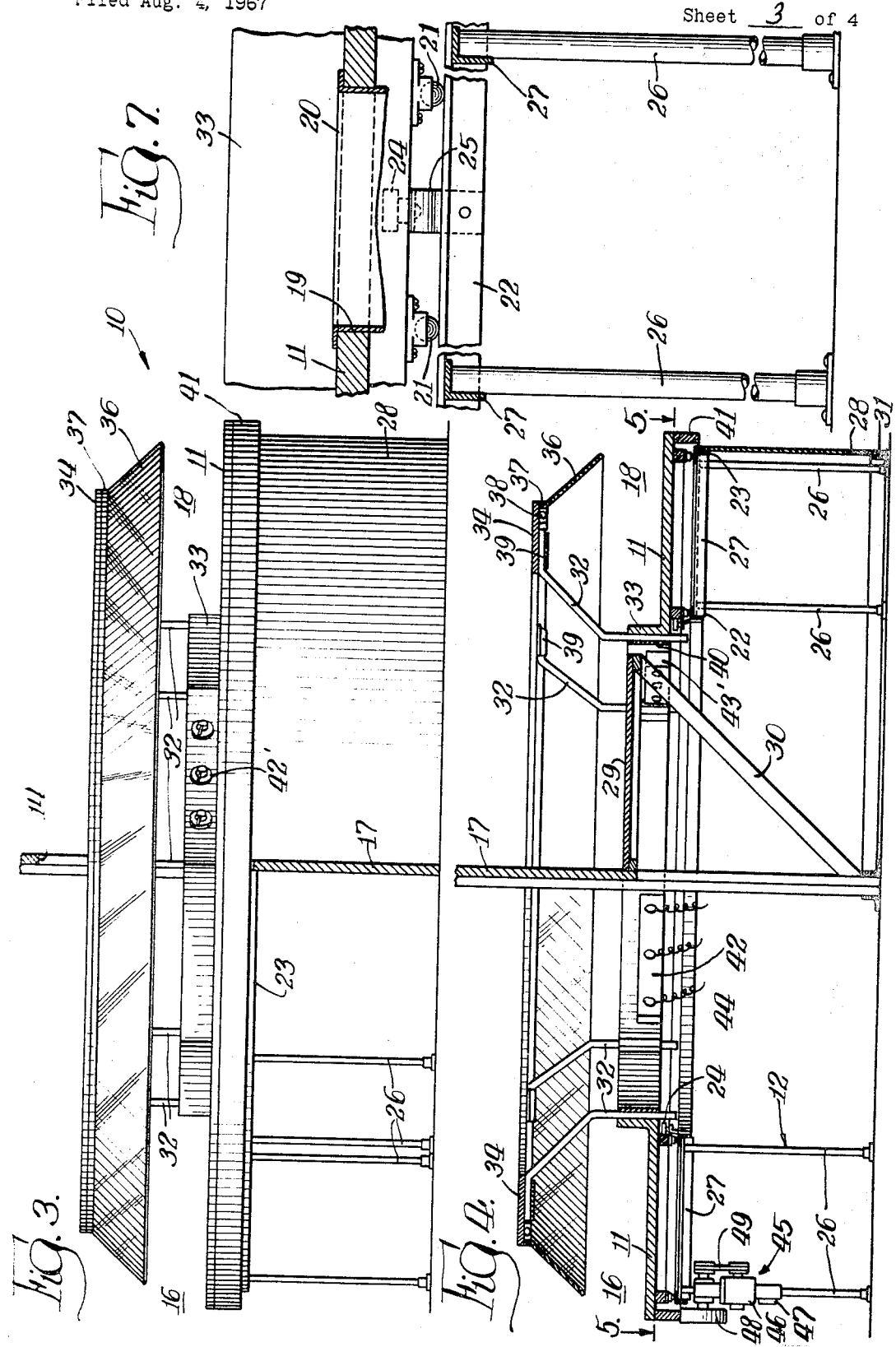

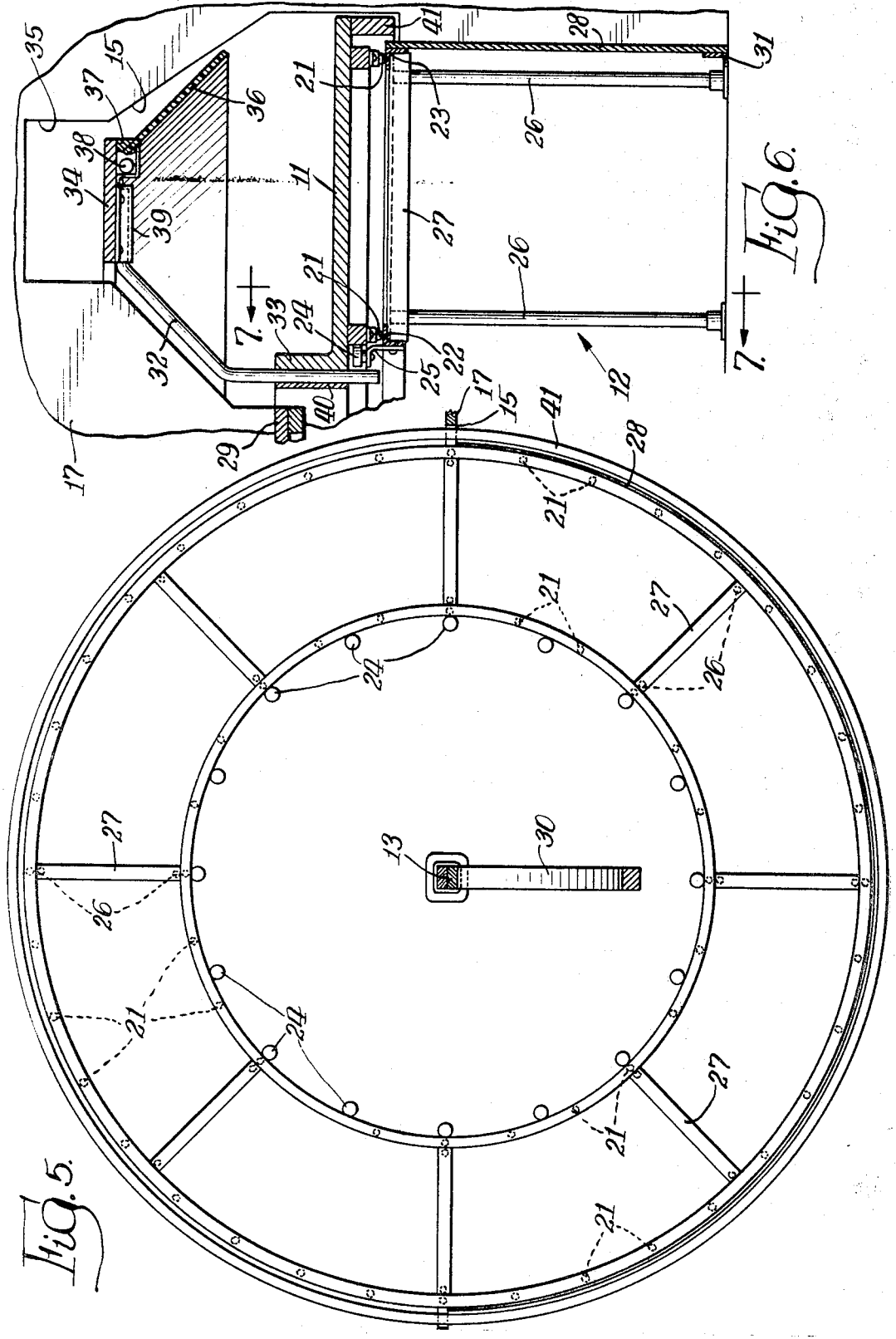

3,437,057
FOOD SERVER
Donald H. Wulff, Manteno, Ill., assignor to Smorgasphere, Ltd., a corporation of Illinois
Filed Aug. 4, 1967, Ser. No. 658,544
Int. Cl. A47f *3/08, 3/10, 5/00*
U.S. Cl. 108—22                                     9 Claims

ABSTRACT OF THE DISCLOSURE

A food server for use in a restaurant and the like having a table and a movable support for the table permitting the table to be moved selectively between a food supplying space and a food serving space. The table is movable through a wall which separates the food serving space from the food supplying space so that the table may be serviced by the restaurant owner behind the wall and then moved through the wall to place the food in an accessible position in the serving space. A guard is disposed above the table to protect the food thereon from contact by the breath of persons selecting food from the table. Heating means and cooling means are provided for controlling the temperature of the food on the table in the serving space.

---

This invention relates to food servers and in particular to food servers for use in restaurants and the like.

In one well known type of restaurant food service, food is served in a buffet or smorgasbord type manner by providing on a table in separate dishes or containers a large number of different foods to be selected by the diner. A problem arises in the use of such buffet or smorgasbord tables in that the various items require replenishment from time to time. To effect such replenishment conventionally the spent container is removed and replaced with a fresh filled container. Thus, the restaurateur must bring the replenishment into the serving area and remove the spent containers from the serving area, at times interferring with the accessibility to table by the patrons. The present invention comprehends an improved food server which eliminates the above discussed disadvantages of the known food servers of this type in a novel and simple manner.

Thus, a principal feature of the present invention is the provision of a new and improved food server for use in restaurants and the like.

Another feature of the invention is the provision of such a food server having new and improved means for facilitating the servicing thereof.

A further feature of the invention is the provision of such a food server including wall means for bounding at one side thereof a food serving space and at the opposite side thereof a food supplying space, a table, and means for mounting the table for movement in a preselected path through the wall means to dispose portions thereof selectively in each of the spaces for placement of food therein in the supplying space and for serving of the food in the serving space.

Still another feature of the invention is the provision of such a food server wherein the mounting means comprises means for guiding the table rotatively about a fixed axis.

A yet further feature of the invention is the provision of such a food server wherein the wall means is provided with a pair of spaced openings and the mounting means comprises means for guiding the table selectively through the openings for movement between the spaces.

Yet another feature of the invention is the provision of such a food server wherein the table is annular and the mounting means comprises means for guiding the table rotatively about a fixed axis.

A further feature of the invention is the provision of such a food server wherein the mounting means comprises a fixed stand and means thereon for movably carrying the table.

Still another feature of the invention is the provision of such a food server further including means for controlling the temperature of the food in the food serving space.

A further feature of the invention is the provision of such a food server including new and improved means for deflecting away from the table the breath of persons taking food from the table.

Another feature of the invention is the provision of such a food server wherein the table is movable through spaced openings in the wall means.

A yet further feature of the invention is the provision of such a food server including means for driving the table in the preselected path.

Other features and advantages will be apparent from the following description taken in connection with the accompanying drawing wherein:

FIGURE 3 is a left side elevation thereof as indicated by the arrows 3—3 in FIGURE 2;

FIGURE 4 is a vertical section thereof taken substantially along the line 4—4 of FIGURE 2;

FIGURE 5 is a horizontal section taken substantially along the line 5—5 of FIGURE 4;

FIGURE 6 is a fragmentary enlarged vertical section taken substantially along the line 6—6 of FIGURE 2; and FIGURE 7 is a fragmentary vertical section taken substantially along the line 7—7 of FIGURE 6.

Figure 1:
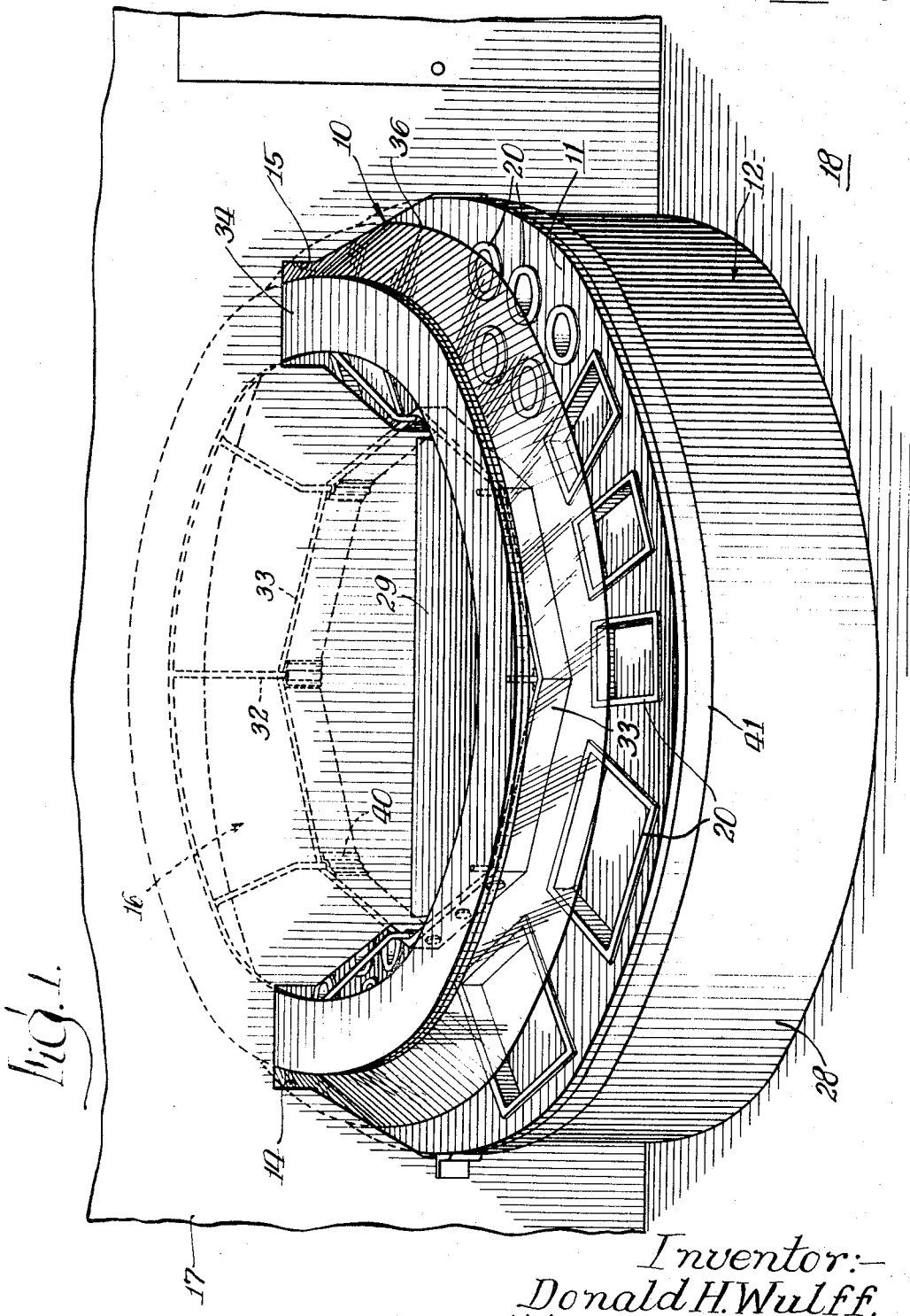
FIGURE 1 is a perspective view of a food server embodying the invention as seen from the food serving space.

In the exemplary embodiment of the invention as disclosed in the drawing, a food server generally designated 10 is shown to compromise an annualar table 11 movably carried to a stand 12 for rotation about a fixed axis 13. As shown in FIGURE 1, the table extends through a pair of openings 14 and 15 to have substantially one-half of the table disposed in a food supplying space generally designated 16 at one side of an upright dividing wall 17 and the other half thereof disposed in a food serving space generally designated 18 at the other side of the wall 17. The table is provided with suitable openings 19 for receiving receptacles, or dishes, 20 in which suitable foods may be placed to be selected by the restaurant patrons in the food serving space 18.

Figure 2:
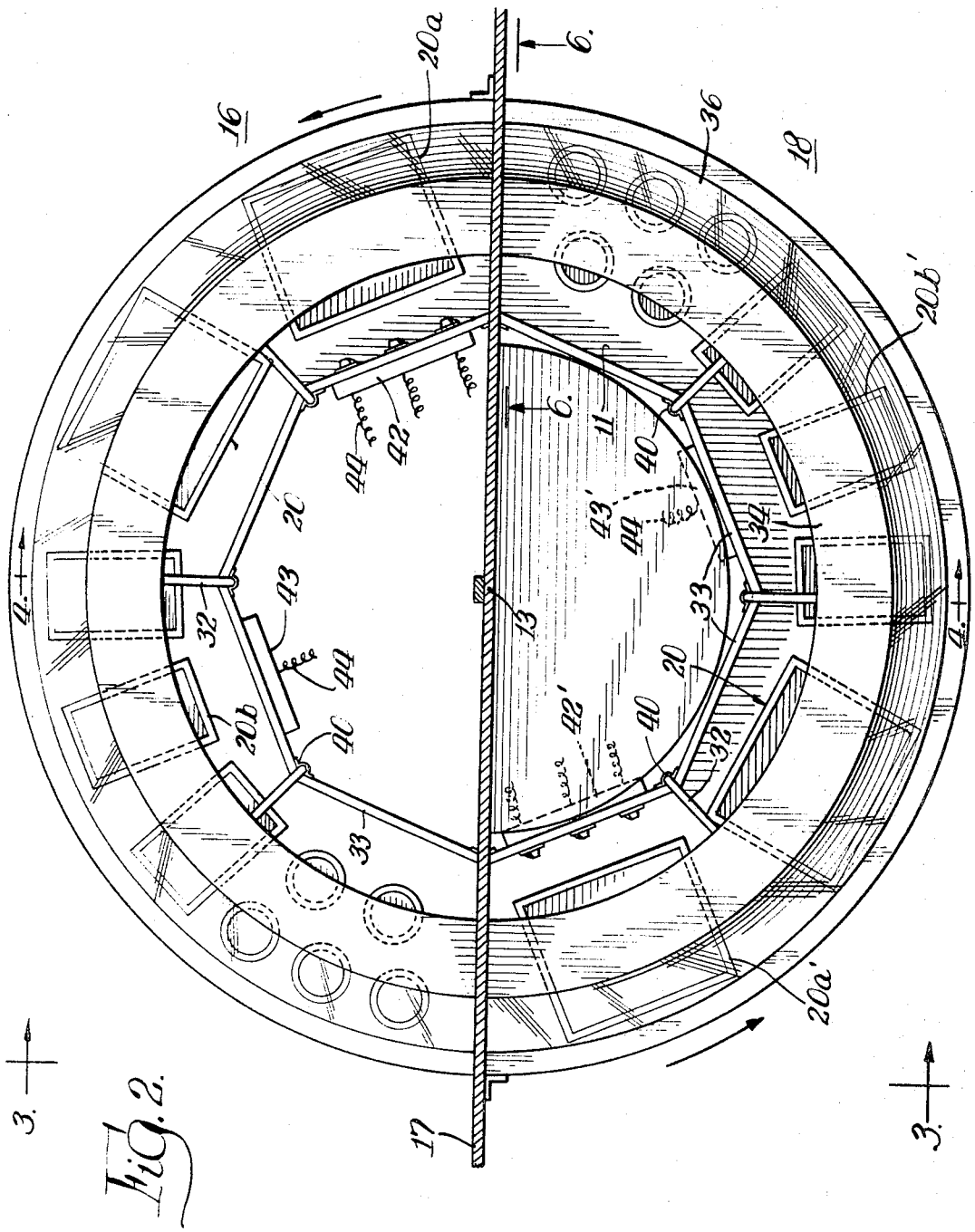
FIGURE 2 is a top plan view thereof.

As shown in FIGURE 2, the annular arrangement of the table 11 permits one-half of the food dishes 20 to be disposed rearwardly of the wall 17 in the food supplying space 16 at all times so that one-half of the food server is available for replenishment of the food thereon at all times, while the other half is available to the patrons selecting food therefrom at all times. The invention comprehends the mounting of the table 11 readily rotatably on the stand 12 selectively as desired by the user for unidirectional movement or for reciprocable movement.

More specifically, the table 11 is provided with a plurality of depending rollers 21 which ride on suitable angle frame tracks 22 and 23 carried on the stand 12. The stand is further provided with a plurality of horizontal rollers 24 carried on suitable brackets 25 secured to the inner track 22, as best seen in FIGURE 6, for guiding the table in an annular preselected path about axis 13 on the tracks 22 and 23. As further shown in FIGURE 6, the stand 12 includes a plurality of upright legs 26 and radial pieces 27 defining the framework thereof. A front cover panel 28 may be provided for aesthetic purposes, as shown in FIGURE 1. Similarly, a semiannular panel 29 may be provided on an angular brace 30 at the center of the table in space 18 for aesthetic purposes, as shown in FIGURES 1 and 4. An angular corner brace 31 may be provided at the inner base of the cover 28 for rigidifying the cover.

As further shown in FIGURES 1, 2, 4 and 6, a plurality of brackets 32 are secured to an upstanding rear wall 33 of the table 11 at annularly spaced intervals to support a top annular wall 34 spaced above the table 11 and adapted to carry additional foodstuffs such as desserts and the like. The openings 14 and 15 include an upper portion 35 providing substantial clearance above the wall 34 to permit such additional foodstuffs to pass through the openings from the supplying space 16 (see FIGURE 6). The wall 34 is further provided with a frusto-conical depending transparent shield 36 secured to the wall 34 by a suitable bracket 37 and serving to deflect the breath of the patrons selecting food from the table 11 away therefrom and thereby prevent contamination of the food as by sneezing or coughing of the patrons. As shown in FIGURES 4 and 6, conventional fluorescent lamps 38 may be installed behind the bracket 37 under wall 34 for illuuminating the table 11. The brackets 32 may be secured to the underside of wall 34 by suitable clips 39 and to the table wall 33 by suitable clips 40, as best seen in FIGURES 1, 2 and 6. Thus, the upper wall 34 and guard panel 36 are carried on the table about the axis 13. As best seen in FIGURE 2, the upright wall 33 comprises a series of rectangular portions octangularly arranged and interconnected by the brackets 40.

The table 11 may be provided with a depending apron 41 for aesthetic purposes extending to below the upper edge of the front cover 28.

The different dishes 20 may be maintained at a desired temperature by suitable heating or refrigerating means as desired. Illustratively, as shown in FIGURES 2 and 4, a tray 20a is provided with a suitable electric heating means 42 for maintaining the tray at a desired elevated temperature whereby the tray may be used to maintain hot foods at the desired temperature in the serving space 18. In the illustrated embodiment, the table 11 is symmetrically arranged with a similar arrangement of dishes 20 in each annular half thereof, and, thus, a second tray 20a' corresponding to tray 20a on the other half of the table may be provided with a corresponding similar electric heating control 42'. Further, illustratively, conventional refrigerating means 43 may be provided for cooling certain of the trays, such as tray 20b as shown in FIGURE 2, and the control of tray 20b' may similarly be cooled by a corresponding refrigerating control means 43'. As will be obvious to those skilled in the art, any suitable heating and refrigerating means may be employed for selectively heating or cooling the desired dishes 20, the heating means 42 and cooling means 43 being illustrative only. In the illustrated embodiment, the electrical energy is supplied to the heating means 42 and cooling means 43 by suitable wires 44, it being understood that other suitable electrical supply means such as sliding contracts may be employed to provide the desired electrical connections to the relatively movable trays as will be obvious to those skilled in the art.

In use, the desired food may be placed in the dishes 20 in the food supplying space 16 and the table then moved about the axis 13 to bring the thusly filled dishes into the serving space 18, while concurrently bringing the remaining dishes into the supplying space 16. The foodstuffs may then be placed on the dishes in the supply space 16 for subsequent movement thereof into the serving space 18 whereupon the dishes originally in the serving space will be automatically disposed in the supplying space 16 for replenishment.

The table 11 may be moved manually as desired. The table may be arranged to be reciprocated 180° back and forth about the axis 13 or to be unidirectionally rotated about the axis 13, i.e. either clockwise or counterclockwise as seen in FIGURE 2. As shown in FIGURE 4, if desired, a drive means generally designated 45 may be provided for moving the table 11. The drive means 45 illustratively may comprise an electric motor 46 controlled by a suitable electric control 47 to drive a wheel 48 against the underside of the table 11. The wheel 48 may in turn be driven by the motor 46 by means of a conventional belt drive 49. As will be obvious to those skilled in the art, other suitable conventional drive means may be employed as desired. Where the movement of the table 11 is to be back and forth 180° from the position shown in FIGURE 2, the drive motor 46 may be a reversible motor.

While I have shown and described one embodiment of my invention, it is to be understood that it is capable of many modifications. Changes, therefore, in the construction and arrangement may be made without departing from the spirit and scope of the invention as defined in the appended claims.

I claim:
1. A food server for use in restaurants and the like comprising:
    wall means for bounding at one side thereof a food serving space and at the opposite side thereof a food supplying space;
    a table defining an annular serving portion;
    means for mounting said table for movement of said serving portion in a preselected path through said wall means at spaced portions to disposed diametrically opposite halves of said table serving portion selectively in each of said spaces for placement of food thereon in said supplying space and for serving of the food therefrom in said serving space, said wall means defining between said spaced portion means extending substantially the full inside diameter of said annular serving portion for preventing viewing of approximately one-half of said serving portion at any time from said food serving space; and
    fixed means within said annular table portion at said serving space for precluding viewing of the inside circumference of said table below said annular serving portion.
2. The food server of claim 1 further including means for controlling the temperature of the food in said food serving space.
3. The food server of claim 2 wherein said temperature controlling means comprises heating means.
4. The food server of claim 2 wherein said temperature controlling means comprises cooling means.
5. The food server of claim 1 further including a transparent wall spaced above said table and movable therewith for deflecting away from said table the breath of persons taking food from said table.
6. The food server of claim 1 wherein said table is annular and said mounting means comprises means for guiding said table reciprocably back and forth in an arcuate path whereby said table may be serviced by a reciprocatory movement thereof.

7. The food server of claim 1 wherein said table defines a central semi-circular free space in said food supplying space.

8. The food server of claim 1 further including means spaced above the table in said serving space for deflecting away from said table the breath of persons taking food from said table.

9. The food server of claim 1 wherein said serving portion comprises a pair of coaxial, vertically spaced annular walls, with means fixedly connecting said walls for concurrent annular movement.

References Cited

UNITED STATES PATENTS

| | | | |
|---|---|---|---|
| 1,186,085 | 6/1916 | Deloatch | 108—20 |
| 1,345,444 | 7/1920 | Horvitz. | |
| 1,466,890 | 10/1923 | Deloatch | 108—20 XR |
| 1,717,235 | 6/1929 | Marmonier | 108—20 XR |
| 2,123,394 | 7/1938 | Anderson | 312—135 |
| 2,447,072 | 8/1948 | Jones | 108—94 |
| 2,945,597 | 7/1960 | Romano | 108—94 |
| 3,216,775 | 11/1965 | Brenner | 312—236 |
| 2,644,567 | 7/1953 | Springer | 198—25 |

FOREIGN PATENTS 54,824   2/1937   Denmark.

BOBBY R. GAY, *Primary Examiner.*

GLENN O. FINCH, *Assistant Examiner.*

U.S. Cl. X.R.

108—94; 211—1.5; 312—135, 140.1, 242